United States Patent
Amano et al.

(10) Patent No.: US 7,250,070 B2
(45) Date of Patent: Jul. 31, 2007

(54) FRACTURED POWDER METAL CONNECTING ROD AND A METHOD OF MANUFACTURING THE SAME

(75) Inventors: Masaki Amano, Utsunomiya (JP); Hideaki Ushio, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 373 days.

(21) Appl. No.: 10/457,785

(22) Filed: Jun. 10, 2003

(65) Prior Publication Data

US 2004/0250652 A1 Dec. 16, 2004

(51) Int. Cl.
*B22F 5/10* (2006.01)
*B23P 17/00* (2006.01)
*B21D 53/84* (2006.01)

(52) U.S. Cl. .............. 75/246; 75/231; 29/888.09; 29/413

(58) Field of Classification Search ................ 75/243, 75/246, 231; 29/888.09, 413
See application file for complete search history.

(56) References Cited

U.S. PATENT DOCUMENTS

| | | | |
|---|---|---|---|
| 4,198,879 A * | 4/1980 | Hornak et al. ........... 74/579 E |
| 4,569,109 A | 2/1986 | Fetouh | |
| 4,768,694 A | 9/1988 | Fabris et al. | |
| 4,802,269 A | 2/1989 | Mukai et al. | |
| 4,860,419 A | 8/1989 | Hekman | |
| 4,884,900 A | 12/1989 | Pirault et al. | |
| 4,936,163 A | 6/1990 | Hoag et al. | |
| 4,970,783 A | 11/1990 | Olaniran et al. | |
| 4,993,134 A | 2/1991 | Hoag et al. | |
| 5,051,232 A | 9/1991 | Summers | |
| 5,105,538 A | 4/1992 | Hoag et al. | |
| 5,109,605 A | 5/1992 | Hoag et al. | |
| 5,131,577 A | 7/1992 | Hoag et al. | |
| 5,169,046 A | 12/1992 | Miessen et al. | |
| 5,208,979 A * | 5/1993 | Schmidt .................. 29/888.09 |
| 5,263,622 A | 11/1993 | Henzler et al. | |
| 5,353,500 A | 10/1994 | Hoag et al. | |
| 5,536,089 A * | 7/1996 | Weber et al. ............... 384/294 |
| 5,551,782 A | 9/1996 | Arnhold et al. | |
| 5,566,449 A | 10/1996 | Okamoto et al. | |
| 5,568,891 A | 10/1996 | Hoag et al. | |
| 5,594,187 A | 1/1997 | Lynn | |
| 5,613,182 A | 3/1997 | Lynn | |
| 5,666,637 A | 9/1997 | Fujiki et al. | |
| 5,974,663 A * | 11/1999 | Ikeda et al. .............. 29/888.09 |
| 6,391,083 B1 * | 5/2002 | Akagi et al. .................. 75/231 |
| 2003/0019100 A1 * | 1/2003 | Hoffmann ................ 29/888.09 |

\* cited by examiner

*Primary Examiner*—Roy King
*Assistant Examiner*—Ngoclan T. Mai
(74) *Attorney, Agent, or Firm*—Westerman, Hattori, Daniels & Adrian, LLP.

(57) ABSTRACT

A method of forming a powder metal fractured bearing component, such as a connecting rod, includes the step of forming a component blank having a bearing aperture for separation of the component blank into a main body and a bearing cap, wherein the component has a hardness in the range of about HRC 22 to about HRC 34. The method also includes the steps of forming a stress riser in the blank where the fracture is to occur, and fracturing the component blank of the connecting rod into a main body and a bearing cap by applying tensile force thereto, in order to form a surface area ratio of >113% on the mating surfaces of the main body and the bearing cap.

17 Claims, 6 Drawing Sheets

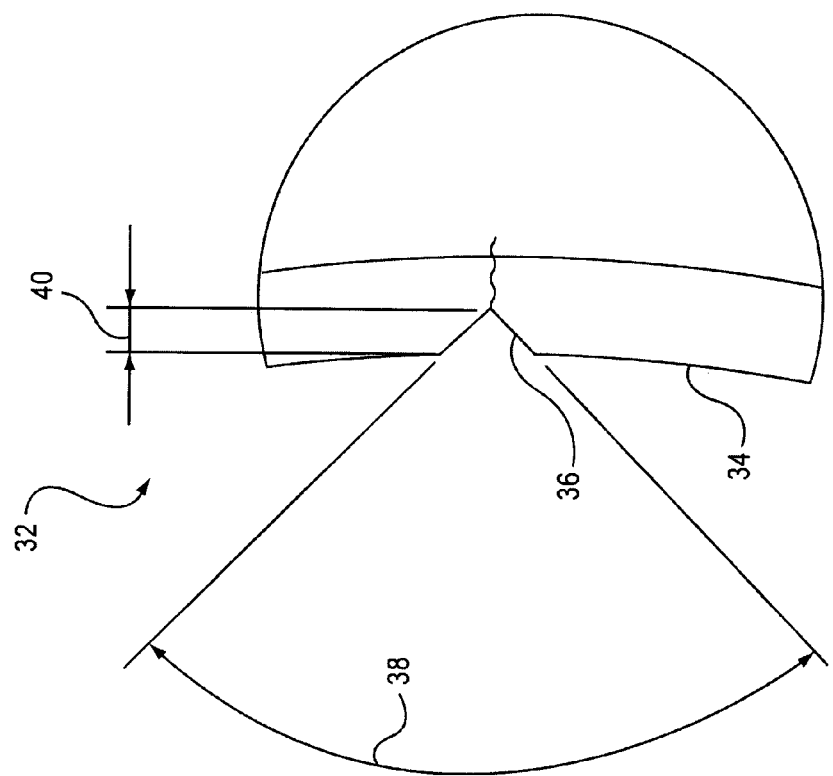
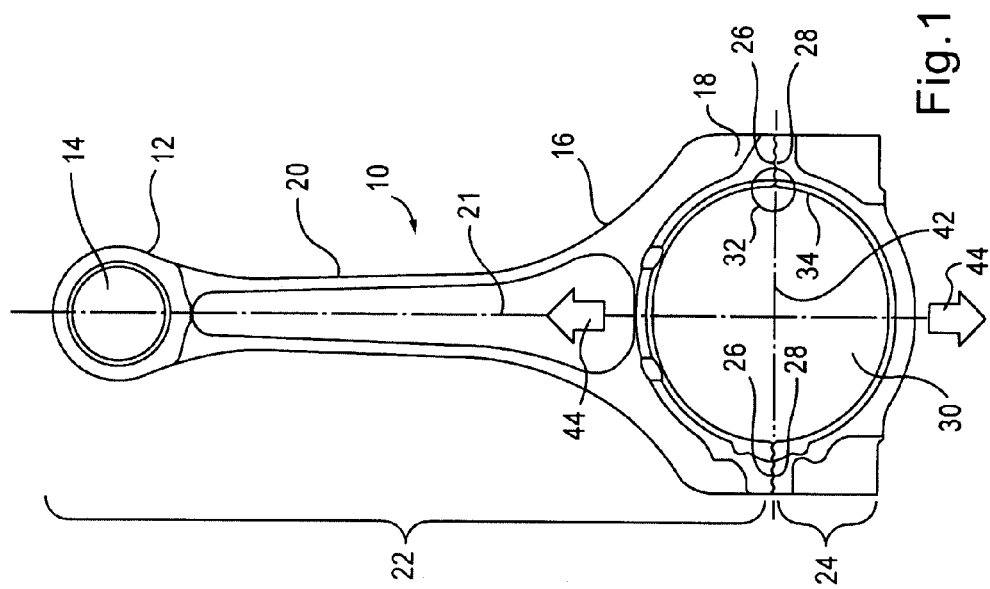

FRACTURED POWDER METAL CONNECTING ROD AND A METHOD OF MANUFACTURING THE SAME

BACKGROUND

The instant invention is directed to a split bearing assembly, having a main body and a separable cap, which are joined together to form a bearing for a journal of a crankshaft or other rotating component. More particularly, the instant invention is directed to a split bearing, fractured powder metal connecting rod for use in an internal combustion engine, and a method of manufacturing the same.

RELATED ART

Various methods of producing connecting rods (including a bearing cap) have been used over the years. The most common method of manufacturing connecting rods (including a bearing cap) has been to form the main body of the connecting rod and the bearing cap separately, by casting, forging or otherwise. Finish machining would then take place before or after assembly. This method requires a large number of machining steps, as well as preliminary assembly and disassembly of the components.

An alternative method involves forming the main body and cap together, and then separating them by sawing or cutting away the excess material originally connecting the main body and the cap. This method requires machining of connecting surfaces and possible preliminary assembly.

The technique of separating the main body and the bearing cap by fracturing has also been employed in the industry. This involves fracturing the components along a predetermined fracture plane, which generally splits the main body and the bearing cap. The fracture plane generally extends between the bearing portions of the main body and the bearing cap. Usually, the fracture plane is perpendicular to the centerline of the main body, but this need not be the case. When the fracturing takes place, the connecting portions between the main body and the bearing cap are not smooth, but are rough, having interlocking surfaces formed therein. These rough, interlocking surfaces form a self-adjusting mechanism when the separated parts are rejoined.

Various methods for fracturing have been employed in the past. These include drilling holes along the fracture plane and providing weakening notches, or stress risers, along one or more edges. Also, extreme temperatures, hot or cold, have employed in order to weaken the fracture plane or cause it to be brittle. However, one problem that occurs sometimes in the fracturing method is that yielding deformation may occur due to excessive bending of the separating parts.

SUMMARY OF THE INVENTION

In today's high performance engines, there is a correlating need for high performance engine components. For example, today's high performance engines are designed for higher and higher rpm's. While this enables the engines to produce more power, it also increases the stress on the engine and its components. Further, as the rpm range increases, a connecting rod, for example, must be stronger in order to withstand the additional stresses it is subjected to. In such a case, harder materials are used to increase the strength of the connecting rod or other part.

In accordance with the instant powder fractured connecting rod, in powder metallurgy, certain kinds of powder (metallic, etc.) are mixed at predetermined ratios, then the mixed powder is formed into a desired shape under pressure with die sets, and finally the shaped mixture is sintered to form a final -metallurgy product. One of the advantages of powder metallurgy is that machining operation is generally unnecessary because powder metallurgy products have a substantially final shape formed in the dies without machining operations.

Recently, powder metallurgy products have been used which have improved machinability over previous ones. This added machinability is obtained without substantially decreasing fatigue strength. Such a mixture for powder metallurgy is disclosed in U.S. Pat. No. 6,391,083, which is herein incorporated by reference. By employing the type of powder metallurgy in a connecting rod of U.S. Pat. No. 6,391,083, it is possible to produce a connecting rod of high strength in order to withstand the demands of today's high performance engines. In producing a connecting rod made up of the above powdered mixture, a blank is first formed in a die set. Then it is necessary to perform the fracturing step in order to separate the blank into a main body and a bearing cap, which are then to be reattached when the engine is assembled. The main body and the bearing cap are separated by applying tensile force to draw the main body and the bearing cap apart. This fracturing is aided by a stress riser disposed on a fracture plane, where the separation is to take place. Once the fracturing has occurred, opposing mating surfaces are formed on the main body and on the bearing cap. The mating surfaces are rough, having interlocking surfaces from the fracturing step, which enables them to be self-aligning when they are assembled together. This roughness is referred to as the "surface area ratio". The greater the ratio, the rougher the surface is. When using the harder material for the connecting rod, the mating surfaces are smoother (after fracturing), than those for a less hard material. When the mating surfaces are smoother, the self-aligning feature is degraded. In order to prevent the self-aligning feature from becoming degraded, it is necessary to better control the fracturing step.

Accordingly, it is desired that the surface area ratio (roughness) be above a certain level in order for the self-aligning feature to properly function. Several ways of controlling the surface area ratio are possible. For example, the surface area ratio may be controlled by varying the depth of the stress riser. Further, the surface area ratio may be controlled by varying the radius of the tip of the stress riser. Additionally, the surface area ratio may be controlled by the speed of fracturing and by the load (or force) of fracturing. It is desirable that the hardness of the connecting rod be about HRC 22-34 and the surface area ratio be greater than or equal to 113%.

A method of forming a powder metal fractured bearing components, includes the steps of forming a component blank having a bearing aperture for separation of the component blank into a main body and a bearing cap, said component having a hardness in the range of about HRC 22 to about HRC 34, forming a stress riser in the blank where the fracture is to occur, and fracturing the component blank into a main body and a bearing cap by applying tensile force thereto, in order to form a surface area ratio of $\geq 113\%$ on the mating surfaces of the main body and the bearing cap.

Further, a fractured powder metal connecting rod, made in accordance with the above method includes, a main body including a small end having an opening therein, a large end having bearing portion, and an intermediate web connecting the small end to the large end, and a bearing cap, operated from the large end by fracturing, and engageable with the large end to form a bearing between the bearing cap and the bearing portion of the large end, wherein the bearing cap and the large end have opposed mating surfaces formed by fracturing, wherein the hardness of the main body and bearing cap is about HRC 22 to HRC 34, and the surface area ratio formed on the mating surfaces is ≧113%.

BRIEF DESCRIPTION OF THE DRAWINGS

FIG. 1 is a side view of a connecting rod in accordance with instant invention;

FIG. 2 is an enlarged view of a portion of FIG. 1.;

DETAILED DESCRIPTION OF THE INVENTION

Figure 3:
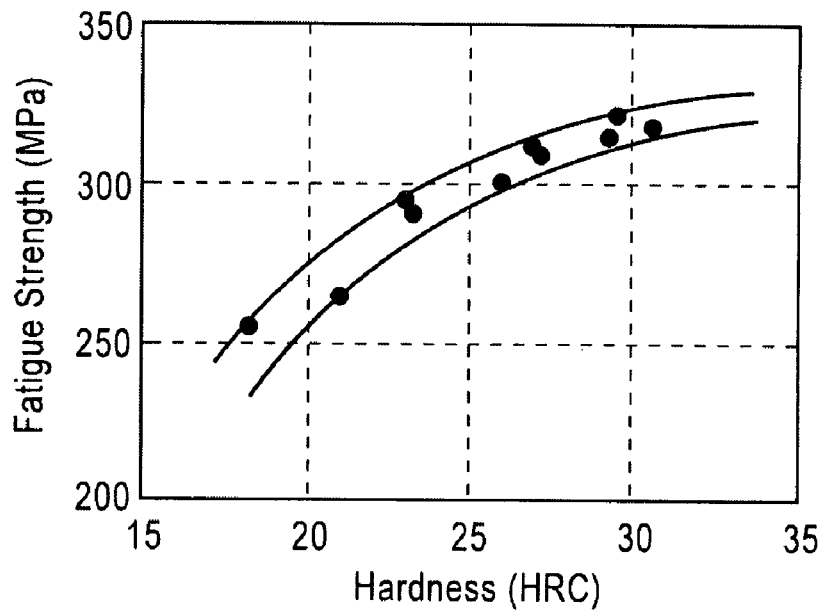
FIG. 3 is a graph illustrating hardness versus fatigue strength.

FIG. 1 illustrates a side view of a connecting rod 10. Connecting rod 10 is also referred to as a blank. Essentially, the connecting rod 10 is a blank until the fracturing takes place, separating the main body 22 from the bearing cap 24. Main body 22 of connecting rod 10 includes small end 12 having an opening 14 therein, and a large end 16. Large end 16 also includes a saddle-like bearing portion 18. Small end 12 and large end 16 are joined together by a web 20 having a center line 21. Opening 14 of small end 12 is generally used to function as a bearing for a wrist pin (not shown) of a piston. Aperture 30 is formed between bearing portion 18 of large end 16 and bearing cap 24. This aperture serves to accept a journal of a crank shaft onto which the connecting rod 10 is assembled. Reference numeral 42 illustrates the fracture plane, perpendicular to center line 21 of web 20.

Mating surfaces 26 of bearing portion 18 of large end 16 oppose and cooperatively engage with mating surfaces 28 of bearing cap 24. Inset circle 32 illustrates an enlarged section shown in FIG. 2. In FIG. 2, a portion 34 of the inner wall of aperture 30 is illustrated. A stress riser (or notch) 36 is formed in inner wall 34. Reference 40 represents the depth the stress riser 36 is recessed into inner wall 34. Reference 38 refers to the notch angle (or radius of the tip). In other words, notch angle 38 refers to the angle of the notch of stress riser 36 formed in the inner wall 34.

FIG. 3 is a graph illustrating hardness versus fatigue strength. The horizontal axis represents hardness (HRC) from 15 to 35. The larger the HRC number, the harder the material. Fatigue strength (MPa) is illustrated on the vertical axis, from 200 to 350. Essentially, FIG. 3 illustrates the point that by increasing hardness, fatigue strength is also increased. Thus, if it is desirable to increase the fatigue strength of a certain component (for example, for a component in a high performance engine), then it is desirable to increase the hardness of that component.

Figure 4:
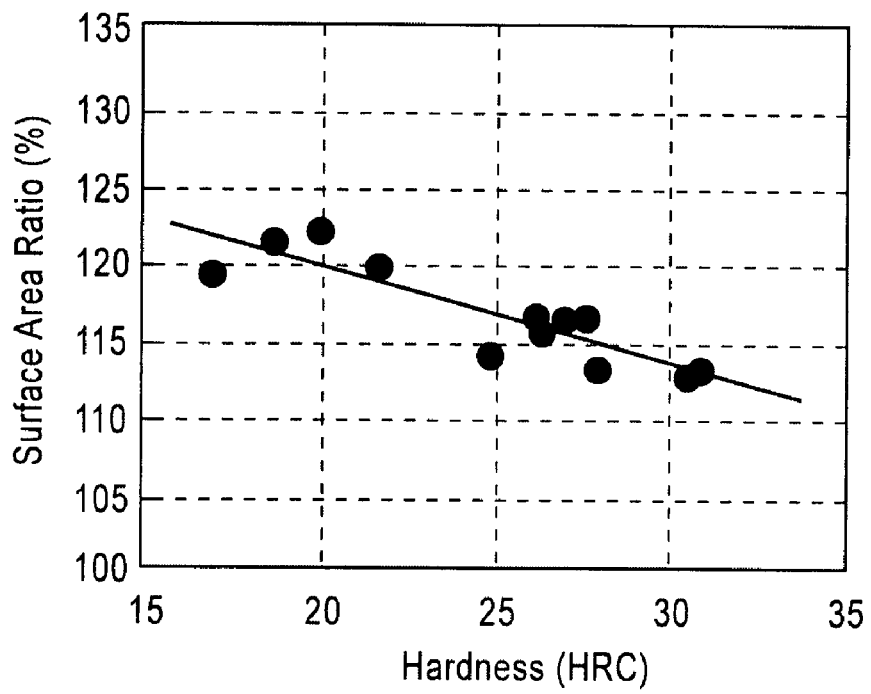
FIG. 4 is a graph illustrating hardness versus surface area ratio.

FIG. 4 is a graph illustrating hardness versus surface area ratio. The horizontal axis represents hardness, similar to FIG. 3. The vertical axis represents the surface area ratio from 100% to 135%. The surface area ratio is measured by a Carl Zeiss Scanning Electron Microscope LSM 5 PASCAL. The microscope, in determining the surface area ratio used a measurement pitch (X direction) of 1.5 mm and a measurement pitch (Y direction) of 50 mm. A magnification of 100 is used and the angle correction method used is a least mean square approximation curve. Measurement speed may be 0.3 mm/s with a normal type of pick up. No Λs filter was used. The surface area ratio indicates a greater roughness of the surface as the ratio increases. For example, 100% may refer to a flat surface and 122% refers to a surface having a certain roughness. More specifically, a 135% ratio is more rough than a 122% ratio. Put another way, the smoother the surface, the lower the ratio. FIG. 4 illustrates that as the hardness increases the surface area ratio decreases. In other words, the harder the material, the smoother the mating surfaces become upon fracturing.

Figure 5A:
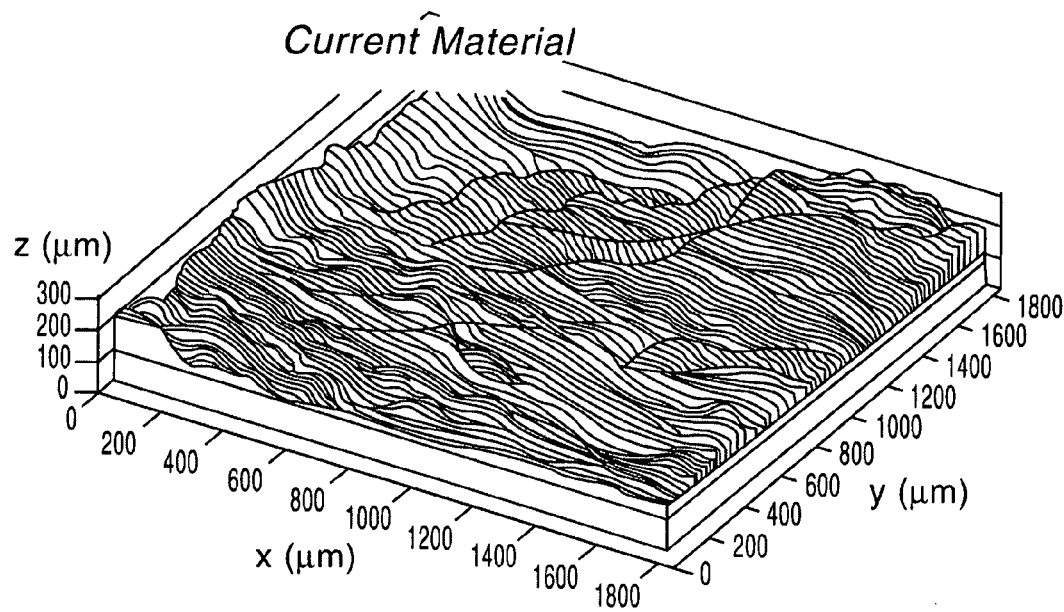
FIGS. 5a and 5b are illustrations (by electron microscope) of a mating surface formed by fracturing of a current material and new material.
Figure 5B:
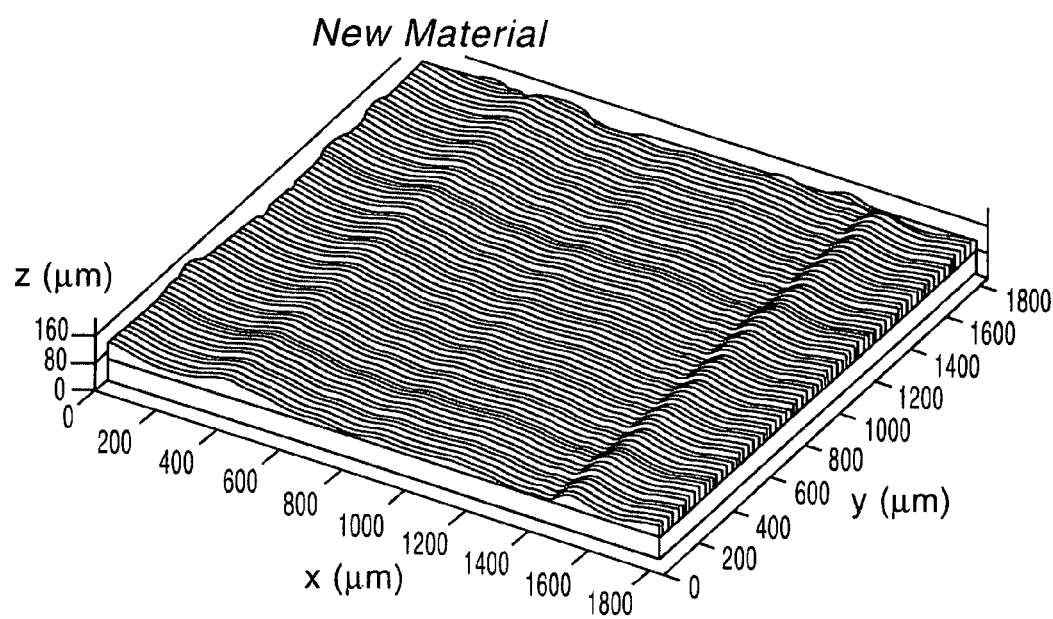

FIGS. 5a and 5b represent the mating surface of a bearing cap or a bearing portion of a main body, as imaged by an electron microscope. FIG. 5a represents conventional material used in a connecting rod. FIG. 5b represents the "new material" used in a connecting rod. The "new material" is a harder material, from 22 to 34 HRC. As can be seen clearly seen from FIGS. 5a and 5b, the new, harder material forms a smoother mating surface upon fracturing. Accordingly, it is desirable to control the fracturing in order to produce the desired surface area ratio.

Figure 6:
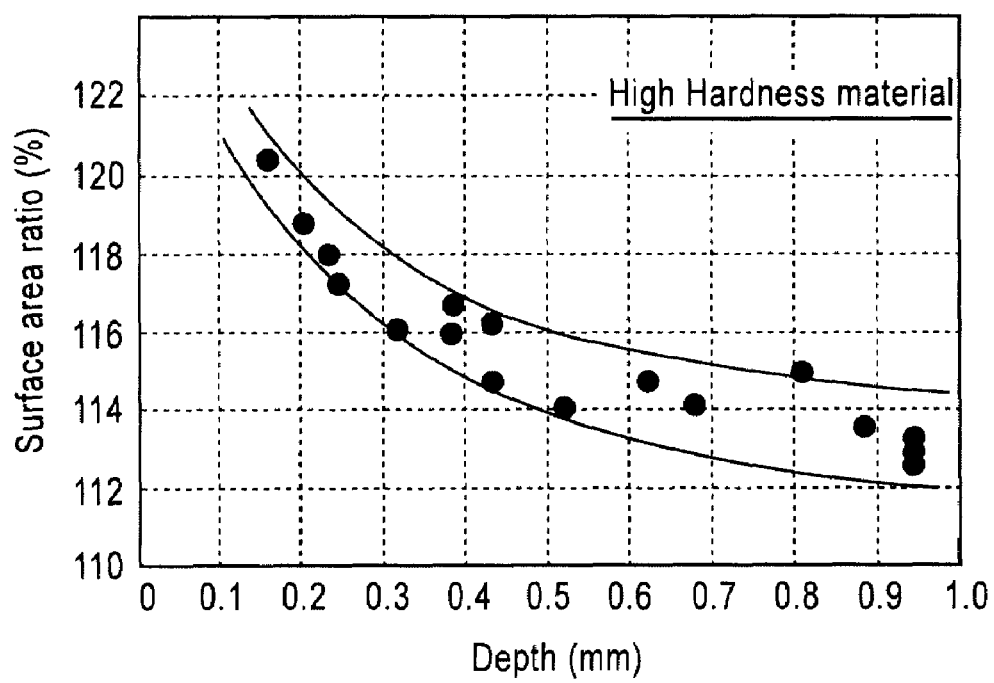
FIG. 6 is a graph illustrating the depth (of a stress riser) versus the surface area ratio.

FIG. 6 illustrates the depth of a stress riser versus the surface area ratio. The horizontal axis represents the depth 40 of the stress riser. This ranges from a depth of 0 mm to 1.0 mm. The vertical axis is the surface area ratio which extends from 110% to 122%. As noted, the larger the number of the surface area ratio, the rougher or more textured the surface is.

Figure 7:
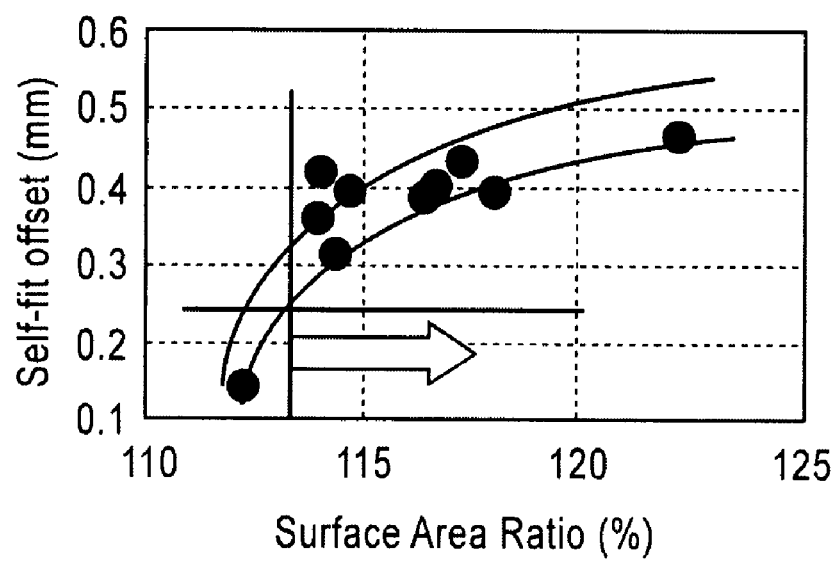
FIG. 7 is a graph illustrating the surface area ratio versus self-fit offset.

FIG. 6 illustrates that the surface area ratio may be controlled by the depth of the stress riser. Specifically, the shallower the depth of the stress riser, the larger the surface area ratio. Thus, in order to obtain a less smooth mating surface, it is desirable with the high hardness material of FIG. 6, to reduce the depth of the stress riser. FIG. 7 is a graph illustrating the surface area ratio verses the self-fit offset. Specifically, the horizontal axis shows the surface area ratio from 110% to 125%. The vertical axis illustrates the self-fit offset (in millimeters) from 0.1 to 0.6.

Figure 8B:
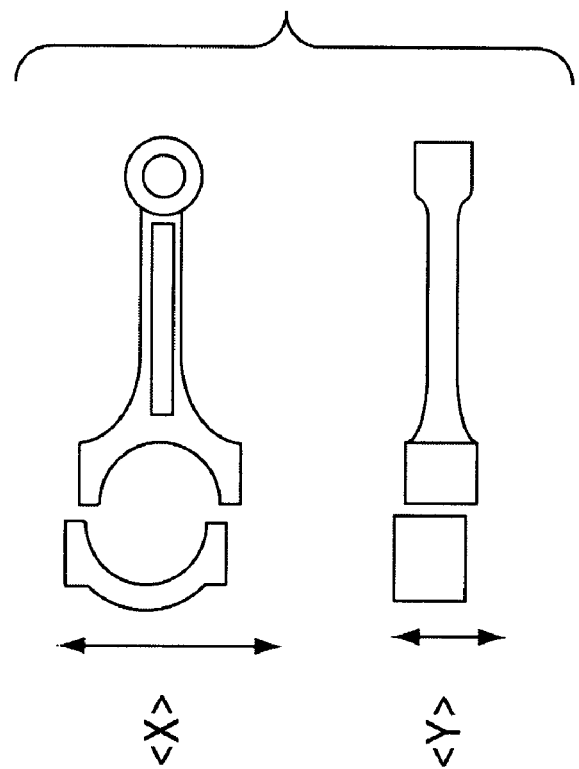
FIG. 8b is an illustration of offset of a bearing cap with regard to a main body of a connecting rod.
Figure 8A:
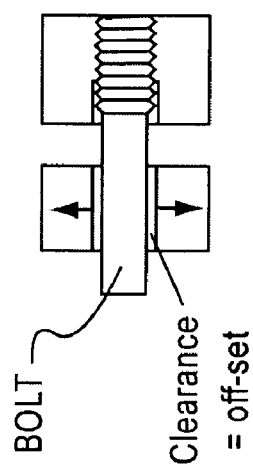
FIG. 8a is an illustration showing clearance of a bolt.

FIG. 8a illustrates the clearance required for a bolt which secures the bearing cap to the main body. FIG. 8b illustrates the clearance or offset in the "X" direction and in the "Y" direction. Because it is difficult to mass produce these components with less than 0.25 mm clearance, the self-fit or self-adjustment must work at a clearance greater than 0.25 mm.

As illustrated in FIGS. 1 and 2, when stress riser 36 is formed in the inner wall 34, along fracture plane 42, the connecting rod 10 is ready for the fracturing step. Specifically, the component blank or connecting rod 10 is formed having an aperture 30 for separating the component blank into a main body 22 and a bearing cap 24. The component has a hardness range of about HRC 22 to about HRC 34. The stress riser, as illustrated in FIG. 2, is formed in the blank where the fracture is to occur, that is, along fracture plane 42. Next the blank is fractured by applying tensile force to separate the main body and the bearing cap. Arrows 44 (in FIG. 1) illustrate the tensile of force applied. When the main body is then separated from the bearing cap, the mating surfaces 26 of the main body and the mating surfaces 28 of the bearing cap have a surface area ratio of greater than or equal to 113%. It is also preferable that the surface area ratio is less than or equal to 120%.

In order to obtain the desired surface area ratio, several methods may be employed. As noted above, the depth of the stress riser can control the surface area ratio. The radius of the tip (or notch angle) of the stress riser also can control the surface area ratio. Additionally, the speed of fracturing or the force of fracturing can control the surface area ratio.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

The invention claimed is:

1. A method of forming a powder metal fractured bearing components, comprising the steps of:
   forming a component blank having a bearing aperture for separation of the component blank into a main body and a bearing cap, said component blank having a hardness in the range of about HRC 22 to about HRC 34;
   forming a stress riser in the blank where the fracture is to occur; and
   fracturing the component blank into a main body and a bearing cap by applying tensile force thereto, in order to form a surface area ratio of greater than or equal to 113% on the mating surfaces of the main body and the bearing cap.

2. The method of claim 1, wherein said bearing component is a connecting rod.

3. The method of claim 2, wherein said component is formed of a mixture for a powder metallurgy product, comprising: iron powder including iron grains which contain MnS therein, the mixture containing the MnS of about 0.65 to about 1.40 weight percent; graphite powder which is contained in the mixture such that an amount of carbon (C) in the powder metallurgy product is about 0.3 to about 0.7 weight percent; and copper (Cu) of about 3.0 to about 5.0 weight percent, wherein an amount (wt % C) of said carbon and an amount (wt % Cu) of said copper is determined to obtain a target fatigue strength FS (Mpa) and a target hardness HR (HRB) based on a relation FS (Mpa) and a target hardness HR (HRB) based on a relation $$FS=66.63\times(\text{wt \% C})+22.61\times(\text{wt \% Cu})+280.84$$

$$HR=22.96\times(\text{wt \% C})+2.99\times(\text{wt \% Cu})+78.91.$$

4. The method of claim 2, wherein said surface ratio is less than or equal to 120%.

5. The method of claim 2, further comprising forming the stress riser as a notch in the component blank along a fracture plane.

6. The method of claim 2, further comprising controlling the surface area ratio by the depth of the stress riser formed in the component blank.

7. The method of claim 2, further comprising controlling the surface area ratio by the radius of a tip of the stress riser.

8. A method of forming powder metal fractured bearing components, comprising the steps of:
   forming a component blank having a bearing aperture for separation of the component blank into a main body and a bearing cap, said component blank having a hardness in the range of about HRC 22 to about HRC 34;
   forming a stress riser in the blank where the fracture is to occur; and
   fracturing the component blank into a main body and a bearing cap by applying tensile force thereto, in order to form a surface area ratio of greater than or equal to 113% on the mating surfaces of the main body and the bearing cap, and further comprising controlling the surface area ratio by the speed of fracturing.

9. The method of claim 2, further comprising controlling the surface area ratio by the force of fracturing.

10. A fractured powder metal connecting rod, comprising:
    a main body including a small end having an opening therein, a large end having bearing portion, and an intermediate web connecting said small end to said large end; and
    a bearing cap, separated from said large end by fracturing, said bearing cap being engageable with said large end to form a bearing between said bearing cap and said bearing portion of said large end,
    wherein said bearing cap and said large end have opposed mating surfaces formed by fracturing, and
    wherein the hardness of the main body and bearing cap is about HRC 22 to HRC 34, and the surface area ratio formed on the mating surfaces is greater than or equal to 113%.

11. The fractured powder metal connecting rod of claim 10, wherein said main body and said bearing cap are formed of a mixture for a powder metallurgy product, comprising: iron powder including iron grains which contain MnS therein, the mixture containing the MnS of about 0.65 to about 1.40 weight percent; graphite powder which is contained in the mixture such that an amount of carbon (C) in the powder metallurgy product is about 0.3 to about 0.7 weight percent; and copper (Cu) of about 3.0 to about 5.0 weight percent, wherein an amount (wt % C) of said carbon and an amount (wt % Cu) of said copper is determined to obtain a target fatigue strength FS (Mpa) and a target hardness HR (HRB) based on a relation $$FS=66.63\times(\text{wt \% C})+22.61\times(\text{wt \% Cu})+280.84$$

$$HR=22.96\times(\text{wt \% C})+2.99\times(\text{wt \% Cu})+78.91.$$

12. The fractured powder metal connecting rod of claim 10, wherein said surface area ratio of said mating surfaces is less than or equal to 120%.

13. The fractured powder metal connecting rod of claim 10, wherein a stress riser is formed between said main body and bearing cap to facilitate fracturing.

14. The fractured powder metal connecting rod of claim 13, wherein the surface area ratio is a function of the depth of the stress riser.

15. The fractured powder metal connecting rod of claim 13, wherein the surface area ratio is a function of the radius of a tip of the stress riser.

16. The fractured powder metal connecting rod of claim 10, wherein the surface area ratio is a function of the speed of fracturing.

17. The fractured powder metal connecting rod of claim 10, wherein the surface area ratio is a function of the force of fracturing.

* * * * *